United States Patent [19]

Charles et al.

[11] Patent Number: 4,726,326
[45] Date of Patent: Feb. 23, 1988

[54] DRAG REDUCING COOLING SYSTEM FOR A VEHICLE

[76] Inventors: Herbert N. Charles, 132 Cecile Avenue, Chatham, Ontario, Canada, N7M 2C3; Uwe W. Schaub, 53 East Adams St., Nepean, Ontario, Canada, K2G 0J1

[21] Appl. No.: 536,022

[22] Filed: Sep. 26, 1983

[51] Int. Cl.⁴ ............................................. F01P 5/06
[52] U.S. Cl. ........................... 123/41.49; 123/41.58; 123/195 C; 180/68.1
[58] Field of Search .... 123/41.31, 41.49, 41.57–41.59, 123/41.62, 41.65, 41.7, 41.11, 195 C; 180/68.1, 68.4

[56] References Cited

U.S. PATENT DOCUMENTS

| | | |
|---|---|---|
| 1,920,833 | 8/1933 | Perkins ............................. 123/41.49 |
| 3,810,518 | 5/1974 | Smale ................................ 180/68.1 |
| 3,856,100 | 12/1974 | Manning ............................ 180/68.4 |
| 4,226,217 | 10/1980 | Haslbeck et al. ................. 123/41.62 |

Primary Examiner—William A. Cuchlinski, Jr.
Attorney, Agent, or Firm—Markell Seitzman; Russel C. Wells

[57] ABSTRACT

A cooling system for a vehicle engine includes a shroud directing air flow to a heat exchanger or radiator in a direction horizontally transverse to the forward direction of movement for the vehicle. The shroud leads to an opening on a side portion of the vehicle body so that a top portion can extend from a leading edge to an operator compartment in a wedge shape manner to cover an engine compartment. The top portion is free of openings to permit uninterrupted air flow over the vehicle body.

2 Claims, 2 Drawing Figures

DRAG REDUCING COOLING SYSTEM FOR A VEHICLE

BACKGROUND AND SUMMARY OF THE INVENTION

This invention relates to a drag reducing cooling system for a vehicle, and more particularly, for a streamlined vehicle with an engine forwardly disposed of a passenger compartment.

When a vehicle is provided with an engine at the front end, it is common practice to position a radiator also at the front end. The vehicle body is formed with an opening at the front end so that when the vehicle is moving forwardly, air will be rammed or directed into the front end opening to provide a source of air to cool the fluid in the radiator. The radiator, as known in the art, is designed as a heat exchanger to transfer heat from the radiator to the air so that fluid within the radiator will be cooled for recirculation through the engine.

When the vehicle is moving forward the vehicle body passes through an air space to define a plurality of air streams passing over the vehicle body. If the air stream paths follow a frequently changing direction the air stream experiences a change in momentum. Pressure forces acting on the vehicle body due to the plurality of air streams passing over it create drag which opposes vehicle movement through the air space. One vehicle structure which significantly changes the direction of the air stream is a forwardly facing opening or louvre used on a vehicle to ram or ingest air to a cooling system.

The vehicle body design which generates the least amount of drag is highly desirable and includes a streamlined forebody. A limiting factor in designing a low drag vehicle body is the forward facing cooling intake opening of the conventional cooling system at the front end of the vehicle. In addition, the frontal location of a conventional radiator is a prerequisite to the use of conventional ram cooling and therefore causes a severe limitation on the shape needed for low drag.

The prior art for front engine vehicles is illustrated by U.S. Pat. No. 4,226,217 (Haslbech, et al) issued Oct. 7, 1980, U.S. Pat. No. 4,081,050 (Hennessey, et al) issued Mar. 28, 1978, and U.S. Pat. No. 1,920,883 (Perkins) issued Aug. 1, 1933. These patents illustrate the previously acknowledged practice of providing forwardly facing openings or side plates extending outwardly from the body to ram or ingest air for the cooling system as the vehicle moves forward.

The present invention provides a solution to the above problems so that the radiator can be positioned adjacent or be a part of the vehicle engine at the front end while at the same time enabling the vehicle body to be designed with non-ram low drag characteristics. The invention provides a means for cooling the engine which does not utilize ram air, that is, no component of the cooling system receives cooling air resulting from the motion of the vehicle. The invention comprises a cooling system for a vehicle with an engine forwardly disposed and mounted in a streamlined body with a top portion extending over the engine and a pair of side portions extending substantially vertically downward. The cooling system includes a heat exchanger assembly and an air passage communicating therewith for transferring heat from the engine to air communicated through the air passage. The top portion and the pair of side portions form boundaries for a plurality of air streams which pass over and around the body when the vehicle is moving. In addition the air passage leads to an opening or openings on the body, and the openings cooperating with the side portions to substantially define uninterrupted air streams across the openings.

It is an advantage of the present invention that the portion of the vehicle body with a forwardly facing component can be a smooth uninterrupted streamlined shape so that air drag developed by the vehicle is minimal. This result follows since the cooling air inlet openings lack a forwardly facing component or louvered projections to ram air to the radiator.

Many other objects, purposes and advantages of the invention will be clear from the following detailed description of the drawings of the preferred embodiment of the invention.

DETAILED DESCRIPTION OF THE DRAWINGS

Figure 1:
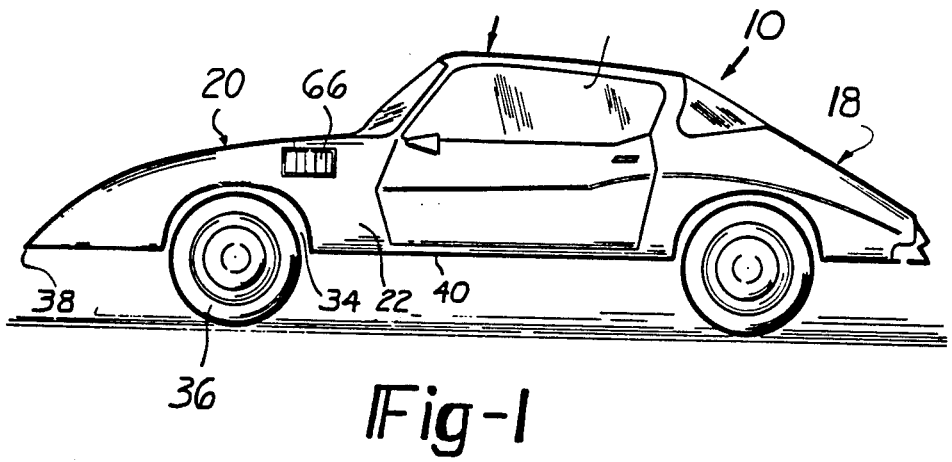
FIG. 1 shows a side view of a vehicle incorporating the invention.
Figure 2:
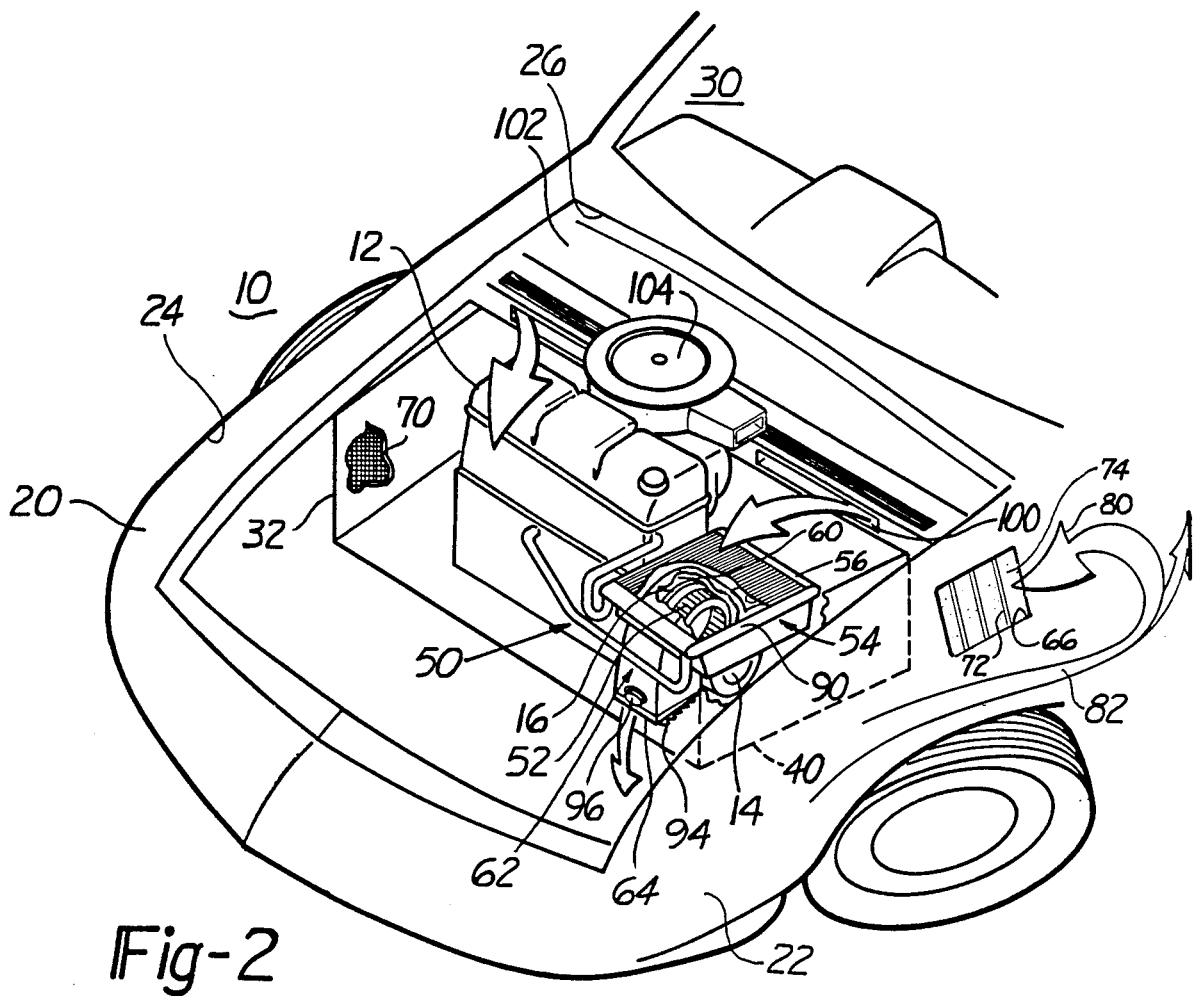
FIG. 2 shows a perspective view of the vehicle constructed in accordance with the present invention.

With reference to FIGS. 1 and 2 a vehicle 10 is provided with an engine 12 mounted at the front of the vehicle on a structure or frame transverse or, alternatively, parallel to the direction of its movement. There is also shown a transmission 14 and flywheel 16. The structure also supports a vehicle body 18 in a known manner. The vehicle body 18 includes a streamlined forward portion (generally shown by numerals 20, 22 and 24) devoid of openings for air induction or openings that cause a turbulent flow. The forward portion further includes a pair of side portions (sides or fenders) 22 and 24. The engine 12 is conventional so that its structure and operation are well known to those skilled in the art. A firewall 26 separates an operator compartment 30 from the engine compartment 32. The side portion 22 is cut out to form a wheel well 34 for receiving a front wheel assembly 36. The side portion 24 is similarly cut out, although not shown. The top portion 20 extends forwardly from the operator compartment 30 to a leading edge 38 which generally defines a bumper. Consequently, the top portion 20 covers the engine compartment 32 and defines a streamlined body section for the engine compartment 32 forwardly of the operator compartment 30. In other words, the top portion 20 is substantially sloped forwardly, forming a smooth surface without outwardly extending projections or openings.

The engine 12 and transmission 14, as illustrated, are transversely mounted relative to the vehicle body 18. However, as mentioned, other mounting relationships are applicable. The engine compartment 32 may be formed by the top portion 20 or hood, fender panels or sides 22 and 24 or fender liners thereof and belly pan 40 or by a separately enclosed compartment as illustrated in FIG. 2. However, it is not a requirement of the invention that the engine compartment be sealed. It may be desirable to fully enclose the engine 12 in an engine compartment 20 using a full belly pan 40 extending forwardly to the leading edge 38. The vehicle 10 further includes a cooling system 50 which preferably includes a centrifugal blower 52 fitted to and rotatable with the flywheel 16. A housing 54 is provided to enclose the flywheel 16 and blower 52.

The housing 54 defines an air passage 56 within which the blower 52 rotates and is provided with an inlet 60 and a discharge scroll 62. The scroll 62 terminates in an outlet 64 for directing the discharge from the blower 52. As illustrated in the accompanying drawings the outlet 64 or discharge from the scroll is directed through the belly pan 40 of the engine compartment 32. In addition, to avoid the re-entry of hot air discharged from the cooling system a downwardly and rearwardly oriented discharge is desirable. A partial or full belly pan 40 extending forwardly to the leading edge 38 is seen as an excellent way of avoiding recirculation of hot air and further ensures that the cooling air will generally enter the engine compartment 32 through openings 66 in either side portion 22 or 24. Alternate locations for the openings 66 may be substituted for the preferred side locations such as providing a screened openings 70 in the engine compartment 32.

The openings 66 may be fitted with a grille 72. However, the grille is completely recessed within its respective opening 66 so that the air streams 82 passing over the side body portion 22 are substantially free of interruptions. A filter or screen 74 may also be fitted within the opening 66 to prevent large particles from entering the engine compartment 32.

It should be noted that by positioning the openings 66 as shown air is drawn from the external reservoirs formed between the external surfaces of the automobile and the external flow. These reservoirs or stagnant air regions exist because the external flow has separated from the surfaces of the vehicle because the changes in surface curvature are too severe to keep the streaming external flow attached.

A heat exchanger or radiator 90 is positioned above and connected to the inlet 60 of the housing. A damper 94 is preferably located in the outlet 64 of the housing to control the quantity of air flowing through the heat exchanger of radiator 90. The damper 94 can alternately be placed upstream in communication with the inlet 60 of the housing 54. The damper may be controlled, in a known manner, by a vacuum or electric positioning device 96 that may be responsive to engine vacuum, temperature or power. It should be understood that the present description is that of the preferred embodiment of the invention and alternate implementations are within its purview. As an example, an electric fan, a belt driven fan or engine driven fan coupled by a flexible shaft, which may be driven from a separate power take-off, may be substituted for the blower 52. Alternately the heat exchanger or radiator 90 may be located in other positions within the engine compartment such as against the firewall.

The air supplied from the openings 66 is communicated through an input duct 100 to the engine compartment 32 or directly thereto from the opening 70 in a wall of the engine compartment. The input duct 100 may be formed as part of the cowl 102. The supplied air is available to the radiator 90 and carburetion device 104. Alternatively, additional ducting can be used to separately communicate the supplied air from an inlet opening 66 directly to either the radiator 90 or the carburetion device 104.

The operation of the system is explained below.

Air is drawn through the openings 66 by the operation of blower 52. The engine driven blower 52 draws or blows the air within the engine compartment through the heat exchanger 90 as long as the damper 94 is open. During engine warm-up from a coldstart condition the damper 94 will be closed thereby providing an environment for rapid engine warm-up by virtue of the enclosed engine compartment. When cooling is necessary under operating conditions such as full throttle or under hot engine conditions, the damper 94 is opened by an actuator 96 in a conventional manner in response to particular operating parameters to permit the flow through of air thus cooling the fluid within the heat exchanger 90. In addition, under operating conditions characterized by light engine load, the blower 52 may be shut or dampered completely or partially off to reduce the power that would otherwise be consumed as compared to conventional cooling systems having a rotating blower or fan mechanism thus improving the overall efficiency of the system.

In view of the present invention, it is seen that the tapered top portion 20 of the body is permitted to extend from the leading edge 38 to the operator compartment without interruptions or openings, thereby creating minimal drag in response to air flow over the top portion. The edge 38 is further designed to align substantially with the bottom of the body 18 to further reduce drag, so that the top portion 20 and the bottom 40 cooperate to define a forward wedge at the front of the vehicle 10 so that air flow over the top body portion is gradually deflected upwardly to pass over the top body portion in the absence of air intake openings. Also, the cooling system embodying, in part, the openings 66, radiator 90 and blower 52 is compactly arranged under the forwardly sloping top portion in front of the engine. And, finally, the side openings 66 are formed without projections extending outwardly from the side portions so that the flow of air within air streams over these openings is substantially uninterrupted.

Many changes and modifications in the above described embodiment of the invention can of course be carried out without departing from the scope thereof. Accordingly that scope is intended to be limited only be the scope of the appended claims.

What is claimed:

1. An automotive vehicle including an engine forwardly disposed within an engine compartment, the vehicle including a top portion, which forms the upper extreme of a fully enclosed engine compartment, and extends forwardly in a decreasing height dimension to a leading edge, the engine compartment further formed by a pair of side body portions which extend downward of said top portion and rearward of said leading edge, and a belly pan which joins said leading edge and said side portions to enclose said engine, at least one opening in one of said side portions to permit non-ram air to enter therein, said at least one opening providing the only means for which air enters said engine compartment, a transveserly extending duct, positioned proximate a cowl of said vehicle, having one end opening into said engine compartment, an engine driven blower having an inlet and an adjustable flow outlet, said outlet positioned to exhaust air through a cooperating opening within said belly pan, a heat exchanger positioned in direct engagement with said inlet to receive the air drawn therethrough by operation of said blower.

2. The vehicle as defined in claim 1 wherein said engine driven blower includes a movable damper for adjusting the air flow through said outlet.

* * * * *